Oct. 28, 1969   N. OLTENDORF   3,475,672
CONSTANT SPEED AND CONSTANT TORQUE CONTROLLERS FOR
SHUNT-WOUND D.C. MOTORS
Filed May 22, 1967   4 Sheets-Sheet 1

INVENTOR
NORMAN OLTENDORF
BY Wallace, Kinzer & Dorn
ATTYS.

United States Patent Office 3,475,672
Patented Oct. 28, 1969

3,475,672
CONSTANT SPEED AND CONSTANT TORQUE
CONTROLLERS FOR SHUNT-WOUND D.C.
MOTORS
Norman Oltendorf, Palatine, Ill., assignor to Microdyne
Inc., Rolling Meadows, Ill., a corporation of Illinois
Filed May 22, 1967, Ser. No. 639,959
Int. Cl. H02p 7/06; H02k 27/20
U.S. Cl. 318—308
16 Claims

ABSTRACT OF THE DISCLOSURE

A constant-speed control circuit for a shunt wound D.C. motor, which is also adaptable to constant-torque control. A voltage divider comprising resistances $Rb$ and $Rc$ is connected in shunt relation to the motor armature; a sensing resistor $Rr$ is connected in series with the armature. The relation of the resistances in such that $$Rr = \left(\frac{Rc}{Rb + Rc}\right) Ra$$

where $Ra$ is the armature resistance; with this relation the voltage $Vr$ across sensing resistance $Rr$ and the voltage $Vc$ across resistance $Rc$ are additively combined to develop a control voltage $KE$ that is proportional to the back EMF of the motor, which is proportional to motor speed. The speed control circuit compares this voltage with a standard voltage representative of a desired speed and regulates the motor armature current accordingly. In one embodiment, control is effected by varying the charging rate of a control capacitor in the trigger circuit of an SCR that supplies the motor armature. In another embodiment, the charging rate of the SCR control capacitor is adjusted only approximately and fine control, based on variations in the sensed voltage $KE$, is effected in the supply circuit between the SCR and the motor armature. For constant torque operation, the speed control circuit is effectively by-passed for armature currents above a given value and a constant armature current is maintained by a supplemental torque control circuit.

Background of the invention

This invention relates to a new and improved controller for a D.C. motor and more specifically to an improved controller for a shunt-wound D.C. motor that is capable of maintaining the motor at a constant operational speed despite substantial variations in the load on the motor and in the line voltage supplied to the motor controller. The invention is applicable to a constant torque mode of operation as well as to constant speed operation.

There are numerous applications in which precise control of the speed of an electrical motor, and specifically a shunt-wound D.C. motor, is essential. Some of these applications require adjustment of the motor speed over a wide range, with provision for precise maintenance of a constant speed at any point within the range. The motor speed frequently must be held to a close tolerance despite the fact that the load on the motor may vary to a substantial extent. Moreover, speed variations that might result from fluctuations in line voltage in the available supply for energization of the motor are often not permissible. By way of example, it may be necessary to maintain an essentially constant motor speed over a range from near zero to 2400 r.p.m. at loads from zero to 2.5 pound-inches and with line voltage fluctuations of as much as ten percent.

Conversely, there are other precision control applications for shunt-wound D.C. motors where a constant torque output is required of the motor, independent of changes in the rotational speed of the motor. In these applications, as in the constant speed applications, line voltage fluctuations must be compensated to prevent changes in the motor operation.

For constant speed operation, one form of controller presently in use incorporates a tachometer generator that senses the rotational speed of the motor shaft. The output signal from the tachometer generator is employed to adjust the current (or voltage) to the motor armature and to maintain the motor speed substantially constant. Abrupt load changes, however, may still cause changes in the motor speed, in control systems of this kind, due to the inherent mechanical inertia of the tachometer generator. For many applications, and particularly for fractional horsepower motor drives, the tachometer generator control system may be too slow in operation, too expensive, and lacking in sufficient sensitivity.

Another kind of constant speed controller for a shunt-wound D.C. motor is based upon detection of the electromotive force generated by the motor, considered as a generator. This back EMF, as it is conventionally called, is essentially proportional to motor speed. The back EMF can be detected by appropriate circuits which measure the voltage cross the motor armature, provided the armature supply voltage is a pulsating direct current such as the output from a half-wave or full-wave rectifier. Known devices of this kind depend upon the fact that the applied armature voltage goes to zero at least once for each cycle of the alternating current supply; measurement of the armature voltage during these null intervals gives a measure of the back EMF of the motor. One example of a system of this kind is disclosed in Patent No. 3,184,-672 to R. J. Mason et al.

One difficulty presented by known constant-speed control systems that measure the back EMF of a shunt-wound D.C. motor is that these systems are inoperable where the armature is supplied with a constant D.C. voltage that does not periodically drop below the back EMF of the motor. On the other hand, a true direct current supply, with a minimum alternating content, is quite desirable in applications requiring precise control of motor speed or torque. Thus, a filtered or otherwise smoothed direct current provides a definite advantage with respect to smoother operation at low speeds through elimination of cogging action in the motor. Motor operation is cooler because the motor operates at unity form factor, which is not the case with a pulsating direct current. Moreover, a greater range of operating speeds and torques is generally possible for a given motor when a constant D.C. supply is employed.

Summary of the invention

It is an object of the present invention, therefore, to provide a new and improved controller for a shunt-wound D.C. motor that permits precise continuous control of motor speed, or torque, maintaining the same constant despite substantial variations in the load to which the motor is subjected or in the line voltage from which the motor is supplied, applicable to direct current excitation with minimal or no A.C. content.

A particular object of the invention is to provide a new and improved controller, for a shunt-wound D.C. motor, that effectively measures the back EMF of the motor and that utilizes this back EMF as a basis for motor control, the controller being applicable to motors excited from any suitable D.C. power source, including a power source affording little or no A.C. content.

Another object of the invention is to provide effective compensation, in a controller for a shunt-wound D.C. motor that controls motor operation on a basis of the measurement of the back EMF of the motor, for variations in the relation between the back EMF and the motor speed that occur at relatively high speeds of motor operation.

An additional object of the invention is to provide a new and improved controller for a shunt-wound D.C. motor that is readily adaptable to either constant speed operation or constant torque operation.

A specific object of the invention is to provide, in a controller for a shunt-wound D.C. motor, an effective and inexpensive adding and comparing circuit for simultaneously adding two sensed voltages and comparing the resultant with a fixed reference voltage to establish the operating conditions necessary to maintain the motor at a constant speed despite substantial changes in load or line voltage.

A further specific object of the invention is to provide a new and improved constant speed or constant torque controller for a shunt-wound D.C. motor that is highly precise and sensitive in operation yet is quite inexpensive in construction.

Accordingly, the present invention relates to a controller for a shunt wound D.C. motor, having a given resistance $Ra$ in the armature circuit of the motor, which controller is capable of maintaining one of two motor performance parameters essentially constant despite substantial variations in the supply voltage and in the other of the two parameters. The two parameters are the motor speed and the motor torque. A controller constructed in accordance with the present invention comprises a sensing resistance $Rr$ connected in series relation with the motor armature and a voltage divider connected in shunt relation to the motor armature, the voltage divider comprising two series-connected resistances $Rb$ and $Rc$. The relation of the aforesaid resistances is approximately $$\frac{Rr}{Ra} = \frac{Rc}{Rb+Rc} = K$$

K being a constant. The controller further includes adder means for additively combining the potentials across the resistances $Rr$ and $Rc$, in opposed polarities, to derive a control signal, and control means for controlling the current to the motor armature in response to variations in that control signal to thereby maintain the aforesaid one performance parameter essentially constant. To provide for adjustment of the one parameter that is maintained constant, the controller preferably includes a reference signal source affording a constant reference potential, means for comparing the control signal with that reefrence potential, and means for adjusting the reference potential to different values corresponding to desired different levels for the performance parameter being maintained constant.

Other and further objects of the present invention will be apparent from the following description and claims and are illustrated in the accompanying drawings, which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

Description of the preferred embodiments

Figure 1:
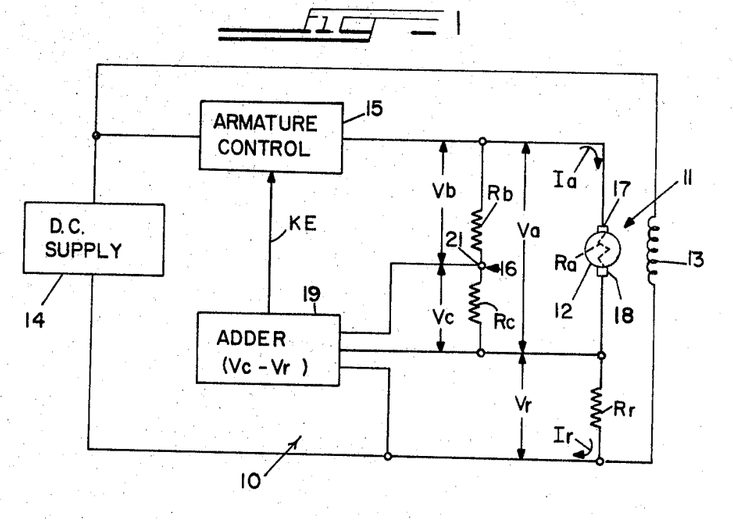
FIG. 1 is a simplified schematic diagram, partly in block form, of a first embodiment of the present invention.

FIG. 1 illustrates a controller 10 constituting a first embodiment of the present invention; controller 10 is employed to maintain a shunt-wound D.C. motor 11 at a substantially constant operational speed despite fluctuations in supply voltage or in the load to which the motor is subjected. Motor 11 is of conventional construction and comprises an armature 12 and a field winding 13. The internal resistance of armature 12 is shown in dash lines and is identified by reference character $Ra$.

In the control system 10 illustrated in FIG. 1, the field winding 13 of motor 11 is directly connected to an appropriate D.C. supply 14. The D.C. supply 14 may comprise a conventional full wave or half-wave rectifier connected to an appropriate A.C. supply, not illustrated. On the other hand, controller 10 is equally capable of affording accurate and effective constant-speed control where the D.C. supply 14 comprises a battery, a rectifier with filters, or any other D.C. source for which the A.C. content of the output voltage is minimal. That is, controller 10 is not dependent upon the use of a particular form of D.C. supply; it will work with any D.C. supply.

Controller 10 includes an armature control unit 15, described more fully hereinafter, that connects one brush 17 of armature 12 to one terminal of D.C. supply 14. A return circuit from the other armature brush 18 to the other terminal of the D.C. supply is also provided. A sensing resistor $Rr$ is connected in series in the operating circuit for armature 12, between brush 18 and supply 14. The series sensing resistance $Rr$ should be substantially smaller than the internal resistance $Ra$ of armature 12.

A voltage divider 16 comprising two series-connected resistances $Rb$ and $Rc$ is incorporated in controller 10. One terminal of voltage divider 16 is connected to brush 17 of armature 12 and the other terminal of the voltage divider is connected to the second brush 18. Thus, voltage divider 16 is connected in direct parallel relation with the armature.

Controller 10 further includes an adder circuit means 19 having three input terminals. One input terminal for adder 19 is connected to the center terminal 21 of voltage divider 16. Another input terminal to the adder is connected to the brush 18 of armature 12. The third input terminal for adder 19 is connected to the return line from resistor $Rr$ to D.C. supply 14. It is thus seen that the input connections to adder 19 are sufficient to apply to the adder both the voltage $Vc$ (across resistance $Rc$) and the potential $Vr$ (across sensing resistance $Rr$). Adder 19 additively combines these two potentials, $Vc$ and $Vr$, in opposite polarities, to derive a control signal KE that is applied to armature control circuit 15. Armature control circuit 15 regulates the current (and voltage) applied to armature 12, increasing the armature current in response to any decrease in the control signal KE and decreasing the armature current in response to any increase in the signal KE.

Before considering the operation of motor controller 10, it is desirable to review the basic relationships that affect the speed of operation of motor 11. Initially, it may be noted that the voltage $Va$ across armature 12 is the sum of the voltage drop across the armature resistance $Ra$ and the back EMF of the motor. That is, (1) $$Va = E + IaRa$$

where $Va$ is the armature voltage,
E is the generated EMF or back EMF of the motor, and
$Ia$ is the armature current.

Furthermore, the motor speed may be expressed by the relationship (2) $$n = E/k\phi$$

in which $n$ is the motor shaft speed in revolutions per minute,
$\phi$ is the magnetic field flux of the motor, and
$k$ is a lumped constant for the particular motor.

For a first order approximation, it may be assumed that the expression $k\phi$ in Equation 2 is essentially constant. On this assumption, it is seen from Equation 2 that the speed of operation of the shunt-wound D.C. motor is approximately proportional to the back EMF E of the motor. Thus, if the voltage E can be measured, it may be employed to control the speed of operation of the motor and to maintain that speed essentially constant. The back EMF for the motor can be sensed directly if the armature 12 is supplied with half-wave or full-wave rectified current that has not been filtered to any substantially extent, during periods when the armature is free-wheeling. That is, the back EMF E can be sensed directly whenever the applied voltage is less than E. However, this is not possible when the D.C. supply 14 is a battery or other substantially constant supply that energizes armature 12 on a continuous basis. This difficulty is eliminated in controller 10.

The relationship expressed in Equation 2 can be rewritten as (3) $$E = Va - IaRa$$

The external sensing resistor $Rr$ in series in the armature circuit of controller 10 is selected to afford a resistance having a predetermined ratio with respect to the internal resistance $Ra$ of the motor armature. This relation may be expressed as (4) $$Rr/Ra = K$$

Preferably, the constant K is much less than unity; for best operation and efficiency, K should be 0.1 or less. Furthermore, the total resistance of voltage divider 16, comprising the sum of the resistances $Rb$ and $Rc$, should be much larger than the internal resistance $Ra$ of the motor armature. Typically, the total voltage divider resistance may be of the order of one thousand or more times the armature resistance. Under these circumstances, the armature current $Ia$ is approximately equal to the current $Ir$ through the sensing resistor $Rr$. Thus, approximately the following reltationship is established:

(5) $$Vr = IrRr = IaRr$$

It will be recognized that the foregoing relationship is not quite exactly correct; $Ia$ is not exactly equal to $Ir$. But Equation 5 is nearly accurate, with the resistance ratios set forth above, and can be accepted as an effective working relation in controller 10.

From Equations 4 and 5, it is seen that (6) $$IaRr = KIaRa = Vr$$

For effective operation of controller 10, there is another impedance relation that must be established, this being (7) $$\frac{Rc}{Rb+Rc} = K$$

where K is the same constant as employed in Equation 4. Since the total voltage drop across voltage divider 16 is equal to the armature voltage $Va$, it is readily apparent from Equation 7 that (8) $$Vc = KVa$$

On the other hand, if Equation 3 is multiplied through on both sides by the constant K, it is seen that (9) $$KE = KVa - KIaRa$$

Substituting the expressions from Equations 6 and 8 in Equation 9, it is seen that (10) $$KE = Vc - Vr$$

It is therefore apparent that by additively combining the voltages $Vc$ and $Vr$, in opposite polarities, it is possible to derive a control signal KE that is proportional to the speed of motor 11. Moreover, the sources of the potentials that are combined to derive the desired control signal are all external to the motor and are not dependent upon periodic nulls iu the voltage applied to the armature. Thus, adder 19 derives a control signal KE, corresponding to Equation 10, that is used by the armature control circuit 15 to control the current to armature 12 and maintain the speed of motor 11 essentially constant. In order to set a predetermined speed for the motor, provision should be made in controller 10 to compare the control signal KE with a constant reference signal representative of the desired speed of operation. An appropriate comparison device may be incorporated in armature control circuit 15 to achieve this purpose, Alternatively, the signal combining function of adder 19 may be performed in a circuit that also is effective to compare the resultant voltage KE with a reference potential. An arrangement of the latter kind is described in detail hereinafter in connection with FIGS. 3 and 4.

Another way to consider the operation of controller 10 is on the basis of positive and negative feedback signals. Thus, in this controller, and in the other embodiments of the invention described hereinafter, the voltage $Vr$ across the sensing resistance $Rr$ is employed as a positive feedback signal that is applied to the armature control circuit 15 to effect an increase in the current supplied to armature 12. The voltage $Vc$, on the other hand, is in effect applied to the armature control circuit 15 as a negative feedback signal that decreases the current to the motor armature. The overall result is such that the back voltage E of motor 11 is held substantially constant even though the total armature current $Ia$ may vary over a wide range due to changes in the armature load. Indeed, voltages $Vc$ and $Vr$ could be applied separately to an appropriate armature control circuit as represented by circuit 15 in FIG. 1, as negative and positive feedback voltages respectively, with no direct additive combination of two potentials. Nevertheless, the overall operating effect is still that of an additive combination, in opposed polarities, as is accomplished in adder 19. The end result is the same when the adding function is a separate and distinct operation as when it occurs through independent use of the feedback voltages.

Controller 10, as described above, provides for precise and continuous control of the speed of motor 11. Motor speed is held constant despite substantial variations in the motor load or in the supply voltage from circuit 14. The controller effectively measures the back voltage of the motor and utilizes that back voltage as the basis for speed control, yet is fully and effectively applicable whether the motor is supplied from a D.C. source having little or no A.C. content or from an ordinary rectifier circuit.

Figure 2:
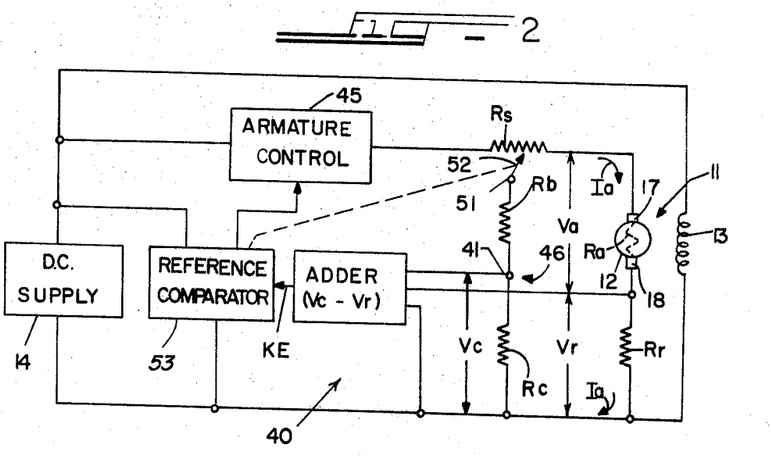
FIG. 2 is a simplified schematic diagram, similar to FIG. 1, illustrating another embodiment of the invention.

FIG. 2 illustrates a controller 40 that is generally similar to the controller 10 of FIG. 1, but is modified in some respects and includes some additional features of the present invention. Controller 40 is utilized to maintain a constant speed for operation of a shunt-wound D.C.

motor 11. As before, motor 11 comprises an armature 12 and a field winding 13 with the internal resistance of the armature being indicated at $Ra$. As in the previous embodiment, field winding 13 is connected directly to an appropriate D.C. supply 14 with speed control being effected by control of the excitation current to armature 12. Preferably, power supply 14 is a full-wave rectifier with effective filtering to produce a substantially constant D.C. excitation signal having little or no A.C. content.

In controller 40 there is an armature control circuit 45 that connects one terminal of the D.C. supply to one armature brush 17. In this instance, however, a series resistance $Rs$ is connected between armature control circuit 45 and brush 17. As in the previous embodiment, the return circuit from the armature to the D.C. supply includes the sensing resistor $Rr$ connected in series from the second brush 18 to the D.C. supply.

Controller 40 further includes a voltage divider 46 comprising two series connected resistors $Rb$ and $Rc$, the common terminal between the resistors being designated by reference numeral 41. In this embodiment of the invention, however, the connection for the voltage divider is slightly different from the arrangement shown in FIG. 1. The voltage divider 46 is connected in shunt relation to armature 12, but also extends across the sensing resistance $Rr$. Furthermore, the upper terminal 51 of the voltage divider is connected to a variable tap in the series resistance $Rs$. It is thus seen that the voltage divider is in parallel with the series combination of the motor armature, sensing resistor $Rr$, and some portion of the series resistance $Rs$, the latter depending upon the setting of tap 52.

An adder means 49 having three input terminals is incorporated in controller 40. One of the input terminals for the adder is connected to the center terminal 41 of voltage divider 46. Another input terminal for the adder is connected to armature brush 18. The third input terminal for adder 49 is connected to the conductor constituting the return line from resistor $Rr$ to D.C. supply 14.

Adder circuit 49 additively combines the voltage $Vc$ across resistor $Rc$ in voltage divider 46 with the voltage $Vr$ across sensing resistor $Rr$. The two voltages are combined in opposite polarities to produce a control signal $KE$. Control signal $KE$ from adder 49 is applied to a reference comparison circuit 53. Comparison circuit 53 may also be provided with electrical connections to the D.C. supply 14 to afford a means for developing a substantially constant reference potential. The circuit arrangement, for this purpose, may include a constant current regulator coupled to a precision resistor with an adjustable tap on the resistor to afford a reference potential of any desired value within a predetermined range representative of the speed range for motor 11. Specific examples of circuits of this kind are described hereinafter in connection with FIGS. 3 and 4. Comparison circuit 53 is provided with an output connection to armature control circuit 45.

The voltage and current relations within controller 40 are essentially similar to those for controller 10 as described above. Initially, it should be observed that sensing resistance $Rr$ should be very much smaller than the internal resistance $Ra$ of armature 12. Under these circumstances, even at low speeds of operation, the armature voltage $Va$ is much larger than the potential $Vr$ across the sensing resistance. As in the previous example, the relationship of the sensing resistance $Rr$ to the armature resistance $Ra$ may be expressed as (4) $\qquad Rr/Ra = K$ Furthermore, the same relationship for the voltage divider resistances $Rb$ and $Rc$ is established as in the previous example; that is, (7) $\qquad Rc/Rb+Rc = K$ With these resistance relationships, it is seen that (11) $\qquad Vc = K(Va+Vr)$ but since $Vr$ is very much smaller than $Va$, it is approximately accurate to state that (8) $\qquad Vc = KVa$ As before, (6) $\qquad Vr = KIaRa$ Consequently, it can be seen that the output signal $KE$ from adder 49 in circuit 40 is essentially the same as the correspondingly designated output signal from adder 19 in controller 10; that is, (10) $\qquad KE = Vc - Vr$ The principal additional feature in controller 40, as compared with controller 10, is the incorporation of the series resistance $Rs$ in the armature circuit. In the discussion of controller 10, in relation to the speed equation (2) $\qquad n = E/k\phi$ it was assumed that the expression $k\phi$ was a constant. As a practical matter, this is not quite true. The field flux $\phi$ of the motor is modified by a counter flux developed by the armature current. The amplitude of this counter flux is dependent upon motor speed. Thus, a constant correction factor cannot be applied to compensate for the armature counter flux over the full controllable speed range of the motor. The effect of the counter flux from the armature is to reduce the field flux $\phi$ and thereby increase the motor speed, even though the counter voltage $E$ of the motor remains constant.

The addition of the small series resistance $Rs$ in the armature circuit, and the provision of a movable tap 52 on this resistance, makes it possible to select a more optimal point for derivation of the negative feedback signal that is supplied to adder circuit 49. At low speed operation, where there is virtually no armature counter flux and the speed is very closely related to the counter voltage $E$ of the motor, tap 52 is maintained at its extreme right-hand position as seen in FIG. 2. That is, little or no resistance is added in the portion of the armature circuit spanned by voltage divider 46 for low speed operation. For higher speed operation, however, the counter flux of the motor has an increasingly greater effect on the total field flux and thus on motor speed. Consequently, for higher speeds of operation, the tap 52 on series resistance $Rs$ is moved to the left to increase the total resistance in the armature circuit with which voltage divider 46 is parallelled. In effect, a greater amplitude of negative feedback is attained, tending to correct any increase in motor speed that would otherwise arise due to reduction in the field flux caused by the counterflux from the armature. Preferably, the movable tap 52 is mechanically connected to the reference potential adjustment in comparison circuit 53 to move tap 52 to the left and increase the series resistance in the armature circuit in shunt with voltage divider 46 as the reference potential is increased to values representative of higher motor speeds. The provision of the adjustable series resistance $Rs$ materially improves the efficiency and accuracy of the control operation and enables maintenance of constant speeds within one percent deviation over the full load range for the motor. That is to say, the variable series resistance $Rs$ in controller 40 effectively compensates for minor variations in the relation between the back voltage of the motor and the motor speed that occur at relatively high speeds of motor operation.

Figure 3:
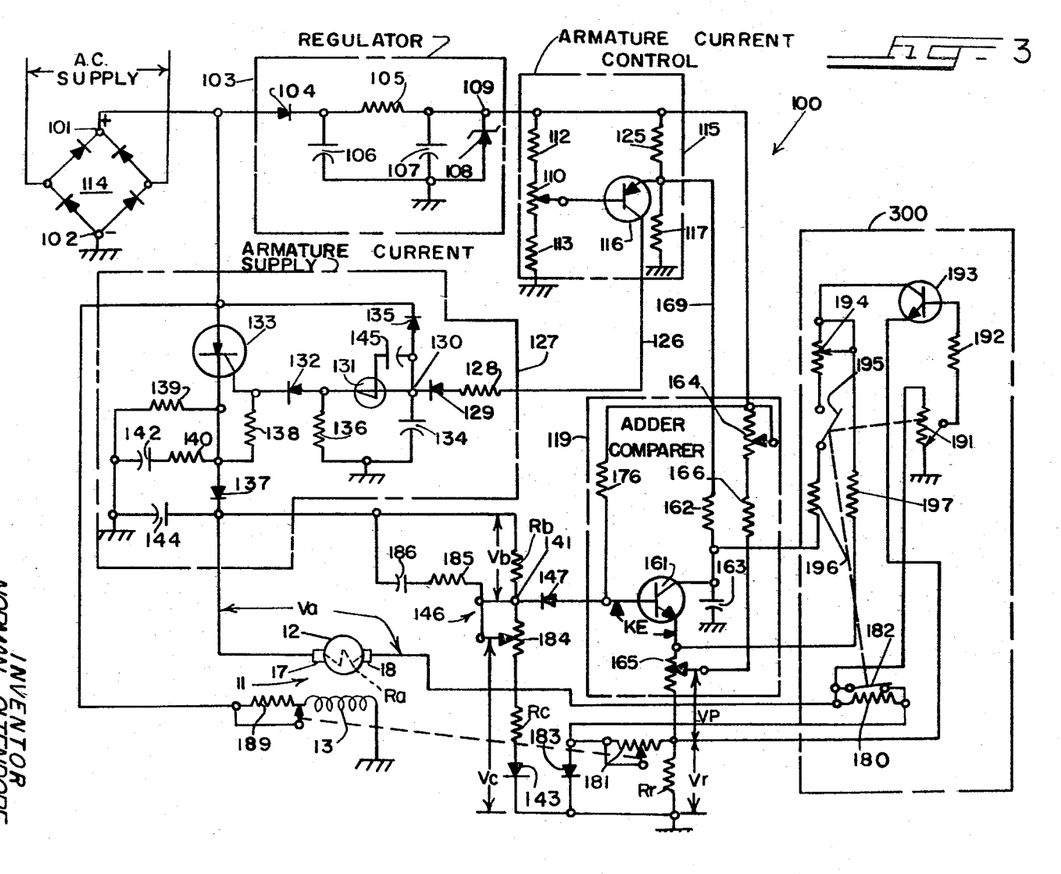
FIG. 3 is a complete circuit diagram of a controller constructed in accordance with another embodiment of the present invention, providing either constant-speed or constant-torque operation.

FIG. 3 illustrates a controller 100 comprising a further embodiment of the present invention. For controller 100, the power supply constitutes a full wave rectifier 114 having its input terminals connected to a suitable AC supply.

The output terminals of the rectifier are identified by reference numerals 101 and 102. In FIG. 3, terminal 102 is taken as a common terminal, shown as system ground. Controller 100 is employed in conjunction with a D.C. shunt-wound motor 11. The field winding 13 of the motor is connected directly to the D.C. supply terminal 101 and is returned to ground. A variable resistor or potentiometer 189 may be connected in series in the field circuit for extended-speed operation, as discussed more fully hereinafter.

Controller 100 includes a regulator circuit 103. Regulator 103 includes a diode 104 and a resistor 105 connected in series with each other, diode 104 being connected to the D.C. supply terminal 101. A capacitor 106 is connected from the common terminal of diode 104 and resistor 105 back to system ground. The other terminal of resistor 105 is also connected to a capacitor 107 that is returned to system ground. A Zener diode 108 is connected in parallel with capacitor 107.

The output terminal 109 of regulator 103 is connected to a controlled constant-current circuit designated in the drawing as armature current control circuit 115. Circuit 115 includes, in its input, a resistor 112 connected in series with a potentiometer 110 and a resistor 113, the series combination of these two circuit elements being connected from the output terminals 109 of regulator 103 to ground. Circuit 115 further includes a transistor 116 having its base electrode connected to the movable tap of potentiometer 110. The emitter of transistor 116 is connected to the positive output terminal 109 of regulator 103 through a series resistor 125. The emitter is also returned to system ground through a relatively large resistor 117. The collector of transistor 116 is connected to a conductor 126 employed to couple circuit 115 to an armature current supply circuit 127.

Armature current supply circuit 127 comprises a resistor 128 and a diode 129 connected in series with each other, resistor 128 being connected to the output conductor 126 from circuit 115. Diode 129 is in turn connected to a series breakdown diode 131 that is connected through a blocking diode 132 to the trigger electrode of a silicon signal-controlled rectifier 133. The junction 130 between diode 129 and breakdown diode 131 is connected to a capacitor 134 that is returned to the negative D.C. supply, indicated as system ground. A diode 135 is connected from terminal 130 to the positive terminal 101 of rectifier 114. Preferably, a resistor 136 is connected from the junction of breakdown diode 131 and diode 132 to system ground, and a filter capacitor 145 is connected between the breakdown diode and terminal 130.

The anode of signal-controlled rectifier 133 is connected to the positive supply terminal 101 of power supply rectifier 114. The cathode of SCR 133 is connected through an isolating diode 137 to one brush 17 of the motor 11. A resistor 138 is connected between the trigger electrode of SCR 133 and the cathode; a further resistor 139 is connected from the SCR cathode to the negative D.C. suppply terminal, here shown as system ground. The series combination of a small resistor 140 and a capacitor 142 is connected in parallel with resistor 139. A filter capacitor 144 is connected from the cathode of diode 137 to system ground.

The second armature brush 18 is connected through resistor 180 to a potentiometer 181 that is in turn connected to a sensing resistor Rr. Sensing resistor Rr is returned to system ground. Resistor 180 is a part of a constant-torque control circuit 300 described more fully hereinafter; for constant-speed operation resistor 180 is shunted by a normally-closed switch 182. A diode 183 is connected from the junction of resistor 180 and potentiometer 181 to system ground.

The cathode of diode 137 is connected to a resistor Rb. Resistor Rb is a part of a voltage divider 146 that includes, in series therewith, a second resistor Rc, the resistor Rc being returned to system ground. Preferably, a diode 143 is connected in series with resistor Rc. A trimmer potentiometer 184 may be connected in series with resistor Rc as a part of that leg of the voltage divider. An R-C phase shift circuit, shown as the series-connected resistor 185 and capacitor 186, may be connected in parallel with resistor Rb for improved A.C. stability.

Controller 100 further includes an adder-comparator circuit 119 comprising a transistor 161. The base electrode of transistor 161 is connected to the center terminal 141 of voltage divider 146 through a diode 147. The iollector of transistor 161 is connected through a resistor 162 to the emitter of transistor 116 in circuit 115. A smoothing capacitor 163 is connected from the collector of transistor 161 back to system ground.

The emitter of transistor 161 in the adder-comparator circuit 119 is connected to one terminal of a potentiometer 165. The other terminal of potentiometer 165 is connected to the sensing resistor Rr. The movable tap of potentiometer 165 is connected through a series resistor 166 and a trimmer potentiometer 164 to the positive output terminal 109 of regulator circuit 103.

In considering operation of controller 100, perhaps the best starting point is the output from the full wave rectifier 114. The output voltage across terminals 101 and 102 (system ground) is a pulsating unipotential voltage corresponding to the waveform 171 illustrated in FIG. 5A. Voltage 171 is supplied directly to field winding 13 of motor 11, FIG. 3. It is also applied to regulator circuit 103. The regulator circuit filters the D.C. output from rectifier 114 and also operates to maintain the amplitude of the voltage substantially constant. Thus, the potential appearing at terminal 109 is a steady potential, as illustrated at 172 in FIG. 5A, with no more than a minimal A.C. content.

The armature current control circuit 115 produces a constant current through its internal resistor 125. The amplitude of this current is not varied, but the current is divided variably between the conductor 126 to the armature current supply circuit 127 and the conductor 169 to the adder-comparator circuit 119. A small part of the current is bypassed to ground through resistor 117. The basic control function of controller 100, maintenance of a constant speed on the part of motor 12, is carried out by the effect of the adder-comparator circuit 119 on the operation of the controllable gate transistor 116 in circuit 115.

In the combined adding and comparing means 119, the voltage $V_c$ from voltage divider 146 is applied to the emitter-base circuit of transistor 161 with a polarity tending to drive the transistor toward greater conductivity in its emmitter-collector circuit. Conversely, the voltage $V_r$ across the sensing resistance Rr is applied to the emitter-base circuit of the transistor with a polarity tending to drive the transistor toward cut off. That is, the operating voltage for the emitter-base circuit of transistor 161, taking into account the connections to potentiometers 165 and 184, is the difference between voltages $V_c$ and $V_r$ and hence is equal to the control signal KE as defined in Equation 10 above.

Resistor 166 and potentiometer 164 establish a bias level for transistor 161 that can be adjusted, by varying potentiometer 165, to conform to the desired speed range for motor 12. By adjusting potentiometer 165, the bias voltage $V_p$ that is applied to the emitter-base circuit of transistor 161 can be adjusted to any desired value within a relatively broad range established by the resistance values in the circuit. The current flowing through the emitter-collector path in transistor 161 thus becomes a function of the control signal KE and the reference potential $V_p$. An increase in potential $V_r$ decreases conductivity in transistor 161 and reduces the current flow through conductor 169. An increase in potential $V_c$ increases the conductivity of the transistor and increases the current flow in conductor 169. By the same token, an increase in the current in conductor 169 is reflected directly in a decrease in the current in conductor 126 and a decrease in the current in conductor 169 provides for a corresponding increase in current in conductor 126.

The current in conductor 126 that couples circuit 115 to circuit 127 charges capacitor 134 in the trigger circuit for SCR 133. When the voltage across capacitor 134 reaches the breakdown voltage of diode 131, the breakdown diode is actuated from an initial condition of very high impedance to a condition of virtually zero impedance. When this occurs, capacitor 134 discharges through diodes 131 and 132 into the gate circuit of SCR 133, rendering the signal-controlled rectifier conductive. Capacitor 134 further discharges through diode 135 on each half cycle of the power line frequency. A ramp voltage thus appears across capacitor 134, with the ramp frequency equal to twice the A.C. line frequency; this ramp voltage is illustrated as voltage 175 in FIG. 5B. The relatively small resistor 140 and capacitor 142 in the SCR circuit assure triggering of the rectifier.

As noted above, transistor 116 serves as a constant current source for charging capacitor 134, so that the ramp voltage 175 is essentially linear. Transistor 161, on the other hand, controls the slope of the ramp by functioning as a diversionary path for a portion of the current through resistor 125, since most of that current would flow to capacitor 134 if transistor 161 were driven completely to cut off. A resistor 176 connected from the base of transistor 161 back to the positive terminal 109 of the regulated and filtered D.C. supply provides a bias for transistor 161 so that the transistor is fully conductive when potentiometer 165 is adjusted for zero speed, at which point reference voltage Vp is zero.

Figures 5A, 5B, 5C, 5D, 6:
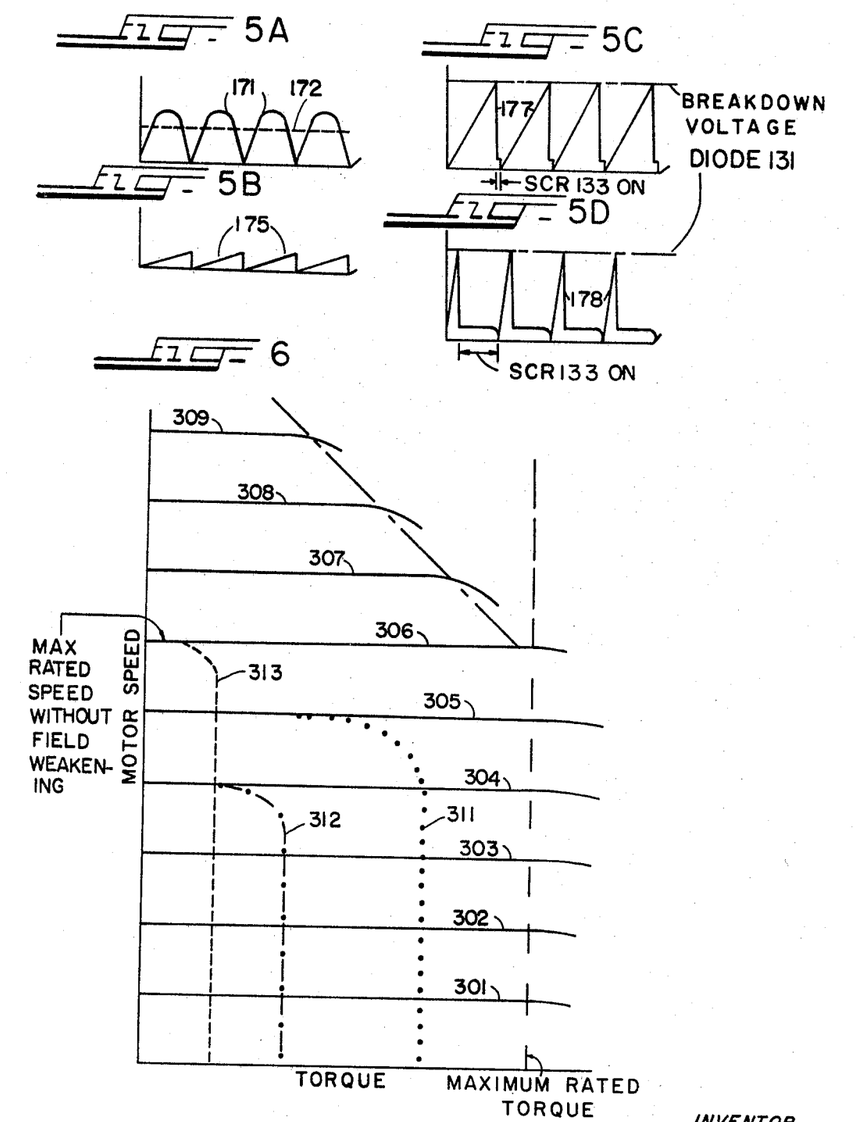
FIGS. 5A through 5D are waveforms illustrative of operations occurring in FIGS. 3 and 4.
FIG. 6 is a diagram of typical speed-torque characteristics obtained with the invention.

Curve 175 in FIG. 5B is illustrative of the voltage across capacitor 134 when motor 11 is not running. In FIG. 5C, curve 177 illustrates the capacitor voltage for low speed operation. As shown in FIG. 5B, SCR 133 is triggered "on" only for a fractional portion of each half cycle at the line frequency. For high speed operation, on the other hand, as illustrated by curve 178 in FIG. 5D, the signal controlled rectifier 133 is driven conductive for the major portion of each half cycle.

It is thus seen that armature current supply circuit 127 constitutes a variable-slope SCR firing circuit, the slope being determined by the amplitude of the charging current supplied to capacitor 134 through conductor 126. On the other hand, the current in conductor 126 is controlled by the operation of transistor 116, in turn determined by the instantaneous conductivity conditions for transistor 161. But the control of transistor 161 is effected in response to variations in the control signal KE above or below the bias level established by the reference potential Vp. It is thus seen that the slope of the firing signal for SCR 133 is controlled by and is a function of signal KE. The control of the firing angle for the SCR can be made to cover a range of 5° to 175° of the half-wave rectified line voltage, depending on the breakdown diode voltage and the maximum charging rate of capacitor 134. A more usual range is about 80°–175°.

In controller 100, speed adjustment is effected in the same manner as described above for controller 10. Armature 12 of motor 11 is essentially supplied with D.C., due to the smoothing action of capacitor 144. Close to unity form factor (typically 1.05) is obtained for the current in armature 12, affording cool running action on the part of the motor and permitting smooth operation at low speeds.

One particular feature in the construction of controller 100 is the provision of diode 143 in the emitter-base circuit of the transistor 161. The base-emitter voltage drop in transistor 161 is quite small and offers little difficulty with respect to control at moderate or high speeds. For low speed operation, however, this internal voltage drop in the transistor may lead to some distortion of the desired constant speed with changes in load. Diode 143 effectively duplicates the internal voltage drop of the transistor, in opposite polarity, effectively compensating for the internal base-emitter voltage drop of the transistor and permitting maintenance of precise control for low speed operation. This is particularly important where motor 11 is required to function at closely controlled constant speed over a range beginning near zero r.p.m. and extending to some substantial value such as 2400 r.p.m. A typical range of operation is 50–2400 r.p.m.; for some motors speeds as low as 20 r.p.m. can be obtained.

As in the previously described embodiments, the operation of controller 100, and particularly the adder-comparator circuit 119 and the armature control circuits 115 and 127, may be described in terms of feedback signals. An increase in the voltage Vr drives transistor 161 toward cut-off and decreases the current through conductor 169. This results in an increase in the current through conductor 126 so that capacitor 134 is charged to the breakdown voltage of diode 131 at an earlier point in each half cycle. It is thus seen that the potential Vr constitutes a positive feedback signal that is applied to increase the voltage to the motor armature, because the increased firing time for SCR 133 increases the amplitude of the voltage and current to the armature supply, capacitor 144. An increase in voltage Vc, on the other hand, has the opposite effect, this voltage being employed as a negative feedback signal relative to the armature voltage. As in the previous embodiments the overall result is that the voltage KE is held constant despite variations in armature current that may result from substantial changes in the armature load.

In the controller 100 illustrated in FIG. 3, the operation of certain specific elements in the circuit remain for consideration. With respect to the potentiometers 110, 164 and 184, their operation can best be understood in relation to the adjustment procedure for the circuit when it is first connected to and is ready to operate in conjunction with a particular motor 11.

For initial adjustment of control circuit 100, the circuit is connected to motor 11, as shown, and the main speed control, potentiometer 165, is adjusted to the zero speed setting. The low speed trimmer potentiometer 110 is then adjusted to make certain that the motor does not rotate. The main speed control potentiometer 165 is then adjusted to a setting corresponding to the minimum control speed for the circuit which may, for example, be approximately fifty r.p.m. The low speed trimmer potentiometer 110 is then re-adjusted until motor 11 is turning approximately at the minimum operating speed for the control.

After this initial adjustment has been made, trimmer potentiometer 110 is left at the setting reached. The main speed control potentiometer 165 is then adjusted to a higher but still relatively low speed as, for example, two hundred r.p.m. With this speed setting, the feedback adjustment trimmer potentiometer 184 that is connected to the resistor Rc is adjusted until the desired speed is actually obtained with the motor. This setting is checked for both no load and full torque conditions to obtain good regulation at low speed for the motor. The optimum setting for potentiometer 184, affording the best regulation for the varying load conditions, is thus obtained.

Thereafter, the speed control 165 is turned to the maximum normal motor speed which may, for example, be 2400 r.p.m. With this setting of the main speed control, the high speed trimmer potentiometer 164 is adjusted and regulation for varying load conditions is established, employing the same procedure as described above for potentiometer 184.

With the simpler circuits described above in connection with FIGS. 1 and 2, there may be some tendency for a loss of speed control at high torque levels. Thus, unstable operation may result from a tendency to develop a rising speed characteristic with increases in load. This tendency is corrected by incorporation, in the circuit of FIG. 3, of the resistor 181 and the diode 183 in conjunction with the sensing resistor Rr. The presence of resistor 181 and diode 183 makes little difference in low torque operation where the positive feedback voltage Vr is relatively low. However, this particular circuit tends to reduce the total positive feedback voltage Vr when that voltage reaches relatively high values under full load conditions. That is, the circuit comprising resistor 181 and diode 183 assists in maintaining stability at high torque loads and assures that any variation in the speed characteristic in this portion of the operating range is toward a speed reduction instead of a speed increase, avoiding unstable operation.

The controller 100 of FIG. 3, by thus far described, provides for operation as illustrated by the series of solid lines 301–306 in the speed-torque chart, FIG. 6. Each of curves 301–306 illustrates the motor speed maintained by the control circuit for a particular speed setting over a wide variation in load from no load to the maximum rated torque for the motor. It will be noted that there is some tendency toward a slight drop in speed but that this occurs, for the most part, for loads above the maximum rated torque of the motor. There is no tendency toward a rising speed characteristic, with increasing torque, which could lead to unstable operation. Even at the maximum rated speed without field weakening, as shown by curve 306, regulation can be maintained within approximately one percent over a range from virtually zero load to maximum rated load.

It is conventional practice to extend the speed of shunt wound D.C. motors, such as the motor 11, above the normal rated maximum speed, by weakening the motor field. This technique is accompanied by a reduction in the available torque output from the motor, but is quite useful in applications where a higher speed of operation is required and the torque requirements are relatively low. In the controller 100 of FIG. 3, such extended-range operation is achieved by use of the potentiometer 189 in circuit with the field winding 13 of the motor, potentiometer 189 preferably being ganged with potentiometer 181.

For extended speed operation, potentiometer 189 is adjusted to increase the effective resistance in the circuit of field winding 13, reducing the motor field and thereby permitting higher speed operation. As the speed is increased by this means, it is necessary to increase resistance 181 to effect the action of diode 183 at a lower armature current amplitude, and this is accomplished by the ganged connection of potentiometer 181 to potentiometer 189. Extended range operation is illustrated, in FIG. 6, by the curves 307, 308 and 309. As is apparent from curves 307–309, the available torque from the motor, at which speed regulation can be maintained, is continuously reduced as the speed is increased in the extension range.

The constant torque circuit 300 that is illustrated in FIG. 3 as a part of the complete controller 100 includes a potentiometer 191 having one terminal of its resistive element connected to the motor brush 18 with the other terminal returned to system ground. The movable tap of potentiometer 191 is connected through a resistor 192 to the base electrode of a transistor 193. The emitter electrode of transistor 193 is connected back to resistor Rr to afford a reverse bias for the emitter, tending to maintain transistor 193 non-conductive. The collector electrode of transistor 193 is connected through the series combination of a variable trimming resistor 194, a switch 195, and a resistor 196 to the collector electrode of transistor 161 in the main controller circuit. The collector of transistor 193 is also connected through a resistor 197 to the emitter of transistor 161.

Switches 182 and 195, in the constant torque control circuit 300, are ganged to potentiometer 191. With the two switches and the potentiometer in the positions shown in FIG. 3, circuit 300 has no effect upon the normal constant-speed operation of the controller because the collector circuit of transistor 193 is open at switch 195 and the base circuit is maintained grounded at potentiometer 191. Further, there is no effective operating voltage for the base circuit of transistor 193 because the resistor 180 is effectively shunted by the normally closed switch 182.

To condition controller 100 for constant-torque operation, potentiometer 191 is actuated from the illustrated position. As soon as the potentiometer is turned, switch 195 is closed to complete the collector circuit for transistor 193. Moreover, switch 182 is opened so that resistor 180 is no longer shunted. The potentiometer 191 is adjusted to a calibrated resistance value corresponding to a desired constant torque for operation of motor 11.

For low torque demands on motor 11, operation is maintained at a constant speed, as described above. The base-emitter voltage of transistor 193, which is proportional to the combined voltage across resistors 180 and 181 and hence to the armature current of motor 11, is not sufficient to drive the transistor to conduction for low armature currents indicative of low torque demands on the motor. As the load on the motor is increased, however, a point is reached at which the voltage across resistors 180 and 181, and the related voltage across potentiometer 191, is sufficient to drive transistor 193 conductive.

When this occurs, transistor 193 effectively bypasses control transistor 161 and assumes control of the motor operation. Thus, any subsequent increase in the armature current of motor 11 increases the forward bias applied to the base-emitter circuit of transistor 193. The resulting increase in conductivity in the emitter-collector path of the transistor causes a larger current to be diverted through transistor 193 from the constant current that flows through resistor 125 in armature current control circuit 115. This in turn reduces the available armature current to the motor, the action of transistor 193 in this respect being similar to that of transistor 161 except that it is armature current instead of back EMF that is employed as the controlling parameter. It is thus seen that circuit 300 is able to maintain a constant armature current, and hence a constant torque, over a relatively broad range of motor speeds.

In FIG. 6, curve 311 illustrates the operation of controller 100 with the constant torque circuit 300 in operation and with the movable tap of potentiometer 191 disposed near the lower portion of the resistance of the potentiometer. Curve 312 illustrates the operation of the circuit with the tap of potentiometer 191 moved upwardly to a substantial extent so that the forward bias applied to the base-emitter circuit of transistor 193 reaches the conductivity level for the transistor at a substantially lower armature current than in the case of the setting that produced curve 311. Curve 313 illustrates the operation of controller 100 with potentiometer 191 set for maximum effective resistance. In this instance, the constant torque control circuit 300 of the controller assumes control of motor operation for a relatively low torque requirement. In a typical circuit, with this setting, the transistor 193 is driven conductive when an armature current of approximately twenty percent of the maximum rated motor current is reached.

It will be noted that curves 311, 312 and 313 indicate different values of constant speed operation for torques below the limiting torques established by the different settings of the constant torque circuit 300. This illustrates the fact that the constant current portion of the controller 100 is still effective and can be used in conjunction with the constant torque control circuit 300. That is, the speed of the motor is held to a constant preset value until the limiting torque setting is reached, after which constant-torque operation is maintained.

Typical circuit parameters are set forth hereinafter, for the controller 100, for use with a 1/15 horsepower shunt wound Bodine motor. It should be understood that these data are presented merely by way of illustration and in no sense as a limitation on the invention.

TABLE OF COMPONENTS

Controller 100

| | | |
|---|---|---|
| Transistor 116 | | 2N4125 |
| Transistors 161, 193 | | 2N4123 |
| SCR 133 | | C32B |
| Diodes 104, 129, 132, 135, 143, 147, 183 | | TS-2 |
| Diode 137 | | 1N3493R |
| Diode 131 | | 2N4990 |
| Diode 108, Zener | v | 20 |
| Resistor 105 | kilohms | 5 |
| Resistors 192, Rc | ohms | 220 |
| Potentiometers 110, 184 | do | 100 |
| Resistor 113 | kilohms | 3.9 |
| Resistor 117 | do | 8.2 |
| Resistor 125 | ohms | 270 |
| Resistors 128, 176 | kilohms | 27 |
| Resistors 136, 138, 112 | ohms | 330 |
| Resistor 139 | kilohms | 6 |
| Resistor 140 | ohms | 10 |
| Resistor 162 | kilohms | 2.2 |
| Potentiometer 164 | do | 1 |
| Potentiometer 165 | ohms | 400 |
| Resistor 166 | kilohms | 1.5 |
| Resistors Rb, 194 | do | 10 |
| Resistor Rr | ohms | 0.75 |
| Potentiometer 181 | do | 1.0 |
| Resistors 185, 196 | kilohms | 6.8 |
| Resistor 180 | ohms | 1.5 |
| Potentiometer 191 | kilohms | 2.5 |
| Resistor 197 | do | 22 |
| Resistor 189 | ohms | 750 |
| Capacitor 106 | microfarads | 25 |
| Capacitor 134 | do | 0.22 |
| Capacitor 137 | do | 0.033 |
| Capacitor 142 | do | 0.068 |
| Capacitor 186 | do | 10 |
| Capacitors 107, 163 | do | 200 |
| Capacitor 144 | do | 250 |

Figure 4:
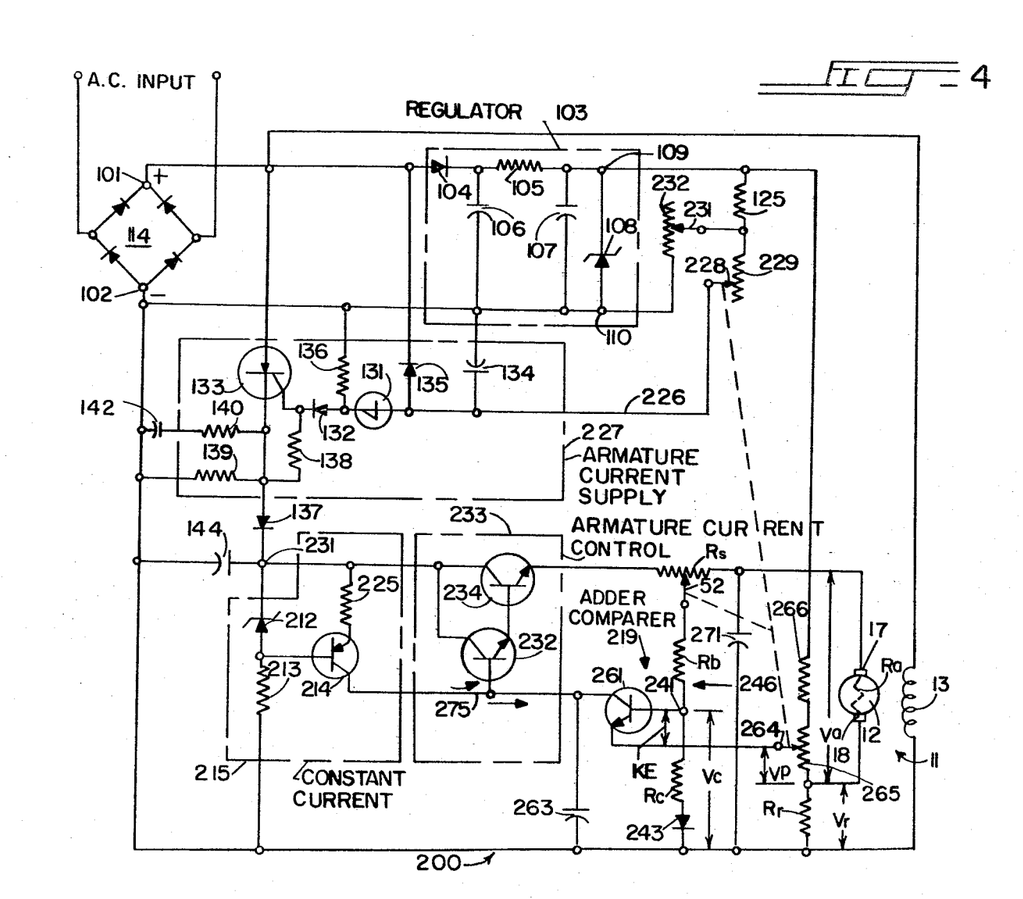
FIG. 4 is a complete circuit diagram of an additional embodiment of the present invention.

Another embodiment of the invention, comprising a constant speed controller circuit 200, is illustrated in FIG. 4. In many respects, controller 200 is essentially similar to previously described controller 100 (FIG. 3). Thus, as shown in FIG. 4, controller 200 employs a conventional full-wave rectifier 114 having a positive terminal 101 and a negative terminal 102. The rectifier is supplied from a suitable A.C. source. Output terminals 101 and 102 are connected to a voltage regulator 103 of a construction corresponding to that illustrated in FIG. 3 and including a series diode 104 and resistor 105 connected between the rectifier terminal 101 and the positive output terminal 109 of the regulator. As before, two filter capacitors 106 and 107 are connected from the opposite ends of resistor 105 to the negative supply terminal 102. A Zener diode 108 is connected across the output terminals 109 and 110 of the regulator.

An armature current supply circuit 227 is incorporated in controller 200; it is generally similar in construction to circuit 127 of FIG. 3. Thus, with reference to FIG. 4, it is seen that circuit 227 comprises a capacitor 134 connected between an input conductor 226 and the negative terminal 102 of the full wave rectifier 114. A diode 135 is connected from conductor 226 back to the positive terminal of the rectifier. A breakdown diode 131 and a blocking diode 132 are connected in series from the input conductor 226 to the trigger electrode of a signal-controlled rectifier 133, a resistor 136 being connected from the common terminal of diodes 131 and 132 to the negative terminal 102 of the power supply rectifier. As before, a resistor 138 is connected from the trigger electrode of the SCR to the cathode; a resistor 139 and a series RC circuit 140, 142 are connected from the SCR cathode to the negative terminal 102 of rectifier 114.

In controller 200, however, there is no automatic adjustment of the firing interval for the SCR corresponding to that provided in the circuit of FIG. 3. Instead, as shown in FIG. 4, the input conductor 226 for armature current supply circuit 227 is connected to the movable tap 228 of a potentiometer 229. One terminal of potentiometer 229 is connected to a resistor 125 that is in turn connected to the positive polarity output terminal 109 of regulator 103. The other terminal of potentiometer 229 is left open-circuited. The common terminal of resistor 125 and potentiometer 229 is connected to the movable tap 231 of a trimmer potentiometer 232. One terminal of potentiometer 232 is left open circuited and the other terminal is connected ot the negative polarity terminal 110 of regulator 103.

The cathode of SCR 133, in controller 200, is connected through a diode 137 to the cathode of a Zener diode 212 in a constant current circuit 215. The anode of diode 212 is connected through a resistor 213 to the negative supply terminal 102. The common terminal 231 of diodes 137 and 212 is coupled to the negative supply terminal through a smoothing capacitor 144.

In the constant current circuit 215, the common terminal of diode 212 and resistor 213 is connected to the base electrode of a transistor 214. The emitter of transistor 214 is connected through a resistor 225 to terminal 231. The collector electrode of the transistor is connected to the base electrode of a first transistor 232 in an armature control circuit 233. The collector of transistor 214 in circuit 215 is also connected to the collector electrode of an adder-comparer circuit transistor 261.

In the armature control circuit 233, the collector electrode of transistor 232 is connected to terminal 231. The emitter electrode of this transistor is connected to the base of a second transistor 234 having its collector electrode connected to terminal 231. The emitter electrode of transistor 234 is connected to a potentiometer Rs which is in turn connected to one brush 17 for the armature 12 of a D.C. shunt wound motor 11.

The principal operating circuits for motor armature 12, in the embodiment of FIG. 4, are generally similar to those described above for the embodiments of FIGS. 2 and 3. Thus, the second brush 18 for the armature is connected back to the negative power supply terminal 102 through a series sensing resistor Rr. A voltage divider 246 comprising two series-connected resistances Rb and Rc is connected in shunt relation to the motor armature circuit. Thus, the external terminal of resistor Rb is connected to the movable tap 52 of the potentiometer Rs. The external terminal of the resistor Rc is connected back to the negative supply terminal 102 through a compensation diode 243.

Controller 200 includes a combined adder and comparer circuit 219 comprising transistor 261. The base electrode of transistor 261 is connected to the central terminal 241 of voltage divider 246. The emitter electrode of transistor 261 is connected to the movable tap 264 of a reference voltage potentiometer 265. One terminal of the resistance of potentiometer 265 is connected to the common terminal of sensing resistor Rr and brush 18. The other terminal of the reference potentiometer is connected through a resistor 266 to the positive polarity output terminal 109 of regulator circuit 103.

Preferably, a capacitor 263 is connected from the collector electrode of the adder-comparer transistor 261 to the negative power supply terminal 102. In addition, a smoothing capacitor 271 may be connected from the common terminal of potentiometer Rs and brush 17 to the negative supply terminal 102.

The operation of controller 200 is somewhat similar to that of controller 100. The voltage across terminals 101 and 102 again corresponds to curve 171, FIG. 5A. Regulator 103 produces, at its output terminals 109 and 110, a substantially constant D.C. voltage current; see curve 172, FIG. 5A. The circuit comprising resistor 125, trimmer 232, and potentiometer 229 supplies a charging current to capacitor 134 through conductor 226. The setting of the two potentiometer taps 228 and 231 determines the amplitude of the charging current; in practice, trimmer potentiometer 232 is set to a particular value for the motor being controlled and potentiometer 229 is adjusted to afford a charging value generally corresponding to that required for a particular motor speed. The voltage across capacitor 134 when the motor is not operating again corresponds to the ramp voltage 175 illustrated in FIG. 5B. The voltage across the capacitor for low speed operation, is again represented by the curve 177 of FIG. 5C, with the signal controlled rectifier gated on only for a short time interval in each half cycle of the applied line voltage 171 (FIG. 5A). And the voltage across the capacitor 134 reaches the breakdown voltage for diode 131 much more rapidly for high speed settings, as illustrated by the curve 178 in FIG. 5D, so that SCR 133 is conductive throughout most of each half cycle of the line voltage for high speed operation.

In controller 200, however, the firing angle of the SCR is not continuously adjusted for small changes in the back EMF of the motor to compensate for minor changes in the motor speed. Instead, the fine control necessary for constant-speed operation is effected by armature control circuit 233 operating in conjunction with constant current circuit 215.

Circuit 215 produces a constant current in the output conductor 275 that is connected to the base electrode of transistor 232 and to the collector electrode of transistor 261. A part of this current flows to the collector-emitter circuit of transistor 261 in the adder-comparer 219. A part of the current is diverted to the base circuit of transistor 232 in control circuit 233. The current in the base circuit of transistor 232 in turn controls conductivity in the emitter-collector circuit of this transistor and determines the base current for series transistor 234. Since the base current to transistor 234 determines the collector-emitter current through that transistor, it is seen that division of the constant current from conductor 275 ultimately controls the operating current to armature 12.

Any change in the voltage KE between the base and emitter electrodes of transistor 261 represents a corresponding change in the back EMF of armature 12, just as in the previously described embodiments of the invention. A variation in this voltage changes the conductivity conditions in transistor 261 and thus modifies the current drawn by the transistor, in turn modifying the division of the constant current in line 275 between the transistors 232 and 261. It is thus seen that changes in the voltage KE are ultimately reflected in changes in the conductivity of transistor 234 and in the amplitude of the current supplied to armature 12. Thus, controller 200 operates to maintain motor 11 at a constant speed, the basic speed being determined by adjustment of the potentiometers 229 and 265.

Potentiometer 229 affords an approximate control for the armature current of the motor, limiting the armature current to a maximum for any given motor speed. A fine or vernier control is exercised by circuit 219, in conjunction with circuit 233, based on measurement of the back EMF of the motor. The result is maintenance of the speed at a constant level within a very close tolerance, which may be one percent or less.

Controller 200 can also be analyzed in terms of feedback signals. Voltage Vr across sensing resistor Rr again constitutes a positive feedback signal which, through circuits 219 and 233, increases the voltage across the motor armature in response to any increase in the armature current. Voltage Vc across resistor Rc, on the other hand, serves as a negative feedback signal in the control of the armature voltage and current. As in the circuit of FIG. 3, the diode 243 serves to compensate for the base-emitter voltage drop of transistor 261 to assure complete accurate control at low speeds.

Hence, while preferred embodiments of the invention have been described and illustrated, it is to be understood that they are capable of variation and modification.

I claim:

1. A controller for a shunt-wound D.C. motor, having a given resistance Ra in the armature circuit thereof, capable of maintaining one of two performance parameters, torque and speed, of said motor essentially constant despite substantial variations in the supply voltage to the motor and in the other of said parameters, said controller comprising:

a sensing resistance Rr connected in series relation with the motor armature;

a voltage divider, comprising two series-connected resistances Rb and Rc, connected in shunt relation to the motor armature;

the relation of said resistances being approximately $$\frac{Rr}{Ra} = \frac{Rc}{Rb+Rc} = K$$

where K is a constant;

adder means for additively combining the potentials across resistances Rr and Rc, in opposed polarities, to derive a control signal;

and control means for controlling the current to the motor armature in response to variations in said control signal to maintain said one performance parameter essentially constant.

2. A controller for a D.C. motor, in accordance with claim 1, and further comprising a reference signal source affording a constant reference potential, and means for comparing said control signal with said reference potential, said control means being effective to control the current to the motor armature in response to variations in said control signal above and below said reference potential.

3. A controller for a D.C. motor in accordance with claim 2, including means for adjusting said reference potential to different values corresponding to desired different values for said one performance parameter that is to be maintained constant.

4. A controller for a D.C. motor in accordance with claim 3, in which said one performance parameter is the motor speed, said controller further comprising a resistance in series with said motor armature and means to adjust said series resistance for different motor speeds in accordance with adjustment of said reference potential means.

5. A controller for a D.C. motor according to claim 3 in which said adder means and said comparing means are combined and comprise a transistor having its emitter connected to said reference potential source and having said resistances Rr and Rc effectively in series with each other in the emitter-base circuit of said transistor, the series connection of said resistances Rr and Rc being such that the respective voltages Vr and Vc across said resistances are in opposite polarities in said emitter-base circuit.

6. A controller for a D.C. motor, in accordance with claim 2, further comprising an armature current supply circuit for said motor including a series gate device connected in series in the armature circuit of said motor and a capacitor charging circuit for actuating said gate device between non-conductive and conductive conditions, and in which said control means comprises a control circuit for adjusting the charging rate of said capacitor charging circuit.

7. A controller for a D.C. motor, in accordance with claim 6, in which said control circuit is a constant current regulator circuit connected to the power supply for said motor and includes a gate circuit for supplying a variable fractional portion of the constant current output of said constant current regulator circuit to said charging circuit in response to variations of said control signal above and below said reference potential.

8. A controller for a D.C. motor, in accordance with claim 6, in which said gate device is a signal-controlled rectifier.

9. A controller for a D.C. motor, in accordance with claim 2, further comprising an armature current supply circuit for said motor including a series gate device connected in series in the armature circuit of said motor and a capacitor charging circuit for actuating said gate device between non-conductive and conductive conditions, and in which said control means comprises an approximate control circuit for adjusting the charging rate of said capacitor charging circuit to limit the armature current to a predetermined maximum, and a vernier control circuit interposed in series in the armature circuit of said motor to control the armature current in response to variations in said control signal above and below said reference potential.

10. A controller for a D.C. motor, in accordance with claim 9, further comprising a constant current regulator circuit interposed between said series gate device and said vernier control circuit in the motor armature circuit, and in which said vernier control circuit constitutes a gate circuit for supplying a variable fractional portion of the constant current output of said constant current regulator circuit to the motor armature in response to variations of said control signal above and below said reference potential.

11. A controller for a shunt-wound D.C. motor, having a given resistance $Ra$ in the armature circuit thereof, capable of maintaining the speed of said motor essentially constant despite substantial variations in the supply voltage to the motor and in the torque output of said motor, said controller comprising:
  a sensing resistance $Rr$ connected in series relation with the motor armature;
  a voltage divider, comprising two series-connected resistances $Rb$ and $Rc$, connected in shunt relation to the motor armature;
  the relation of said resistances being approximately $$\frac{Rr}{Ra}=\frac{Rc}{Rb+Rc}=K$$

where K is a constant;
  speed control means for controlling the current to the motor armature in response to applied signal voltages;
  and means for applying the signal voltage $Vc$ across said resistance $Rc$, and the signal voltage $Vr$ across said resistance $Rr$, to said control means, one as a positive feedback signal and the other as a negative feedback signal.

12. A controller for a D.C. motor, in accordance with claim 11, and further comprising settable torque control means, connected to said speed control means, for limiting the current to the motor armature to a pre-set maximum current to maintain a constant maximum torque output by said motor over a substantial speed range, said controller maintaining the motor at a constant speed for any torque below said maximum.

13. A controller for a D.C. motor, in accordance with claim 12, in which said speed control means comprises a first control transistor having its emitter connected to a reference potential source, having said resistances $Rr$ and $Rc$ effectively in series with each other in the emitter-base circuit of the transistor, and having its emitter-collector circuit coupled to the armature supply circuit of said motor;
  and in which said torque control means comprises a second control transistor having its emitter-collector circuit connected in parallel with the emitter-collector circuit of said first control transistor and having its base-emitter circuit connected to the armature circuit of said motor.

14. A controller for a D.C. motor, in accordance with claim 11, including a first variable resistance connected in series with $Rr$ for the purpose of effecting a reduced torque output capability, and further including a second variable resistance connected to the field winding of the motor, said first and second variable resistances being operated conjointly to provide an extended speed range for the motor.

15. A controller for a D.C. motor in accordance with claim 5 and further including a diode connected in series with said resistance $Rc$.

16. A controller for a D.C. motor in accordance with claim 5 and further including a diode connected in parallel with said resistance $Rr$ to maintain stability of operation for high torque loads.

References Cited
UNITED STATES PATENTS

| | | | |
|---|---|---|---|
| 2,734,160 | 2/1956 | Franks et al. | 318—308 |
| 2,754,463 | 7/1956 | Hansen et al. | 318—308 |
| 3,229,182 | 1/1966 | Kubler | 318—331 |
| 3,329,879 | 7/1967 | Wigington | 318—331 |
| 3,344,332 | 9/1967 | Polries | 318—332 |
| 3,373,330 | 3/1968 | O'Brien | 318—332 |
| 3,412,305 | 11/1969 | Kanner | 318—332 |

ORIS L. RADER, Primary Examiner

LESTER L. HEWITT, Assistant Examiner

U.S. Cl. X.R.

318—317, 331, 332, 349